(Model.)
J. M. WESTCOTT.
FERTILIZER DISTRIBUTER.
No. 253,454. Patented Feb. 7, 1882.
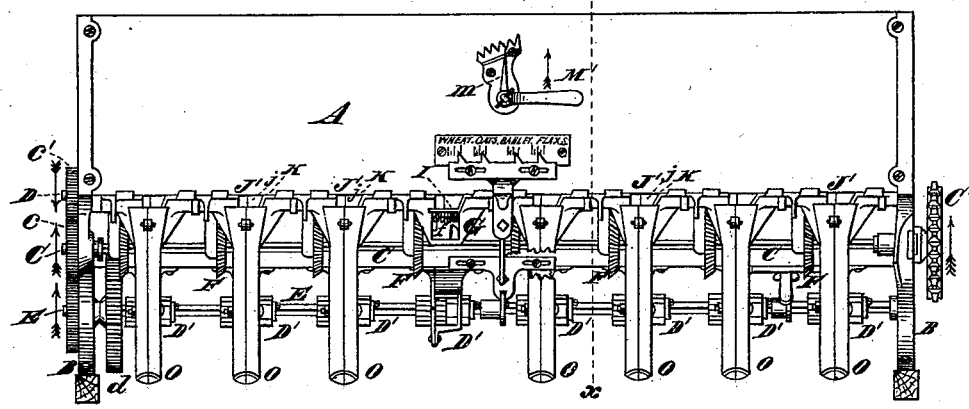
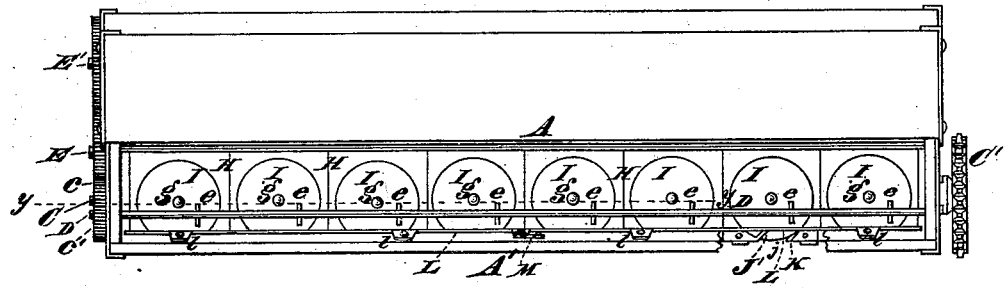
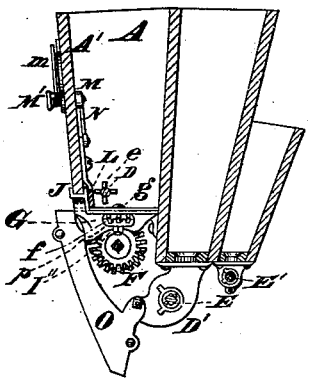
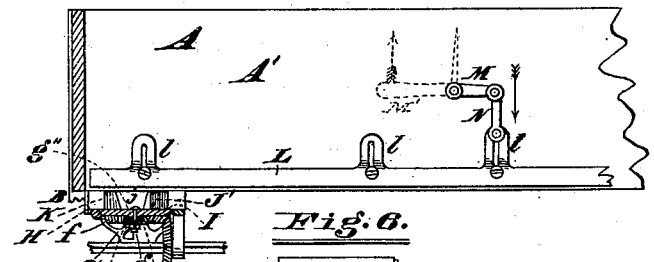
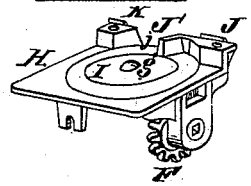
Attest
Jno. S. Jones
Eugene L. Pinckard
Inventor
John M. Westcott,
By Wood & Boyd,
his Attorneys

UNITED STATES PATENT OFFICE.

JOHN M. WESTCOTT, OF RICHMOND, INDIANA.

FERTILIZER-DISTRIBUTER.

SPECIFICATION forming part of Letters Patent No. 253,454, dated February 7, 1882.

Application filed February 23, 1881. (Model.)

*To all whom it may concern:*

Be it known that I, JOHN M. WESTCOTT, a citizen of the United States, residing at Richmond, in the county of Wayne and State of Indiana, have invented certain new and useful Improvements in Fertilizer-Distributers, of which the following is a specification.

My invention relates to an improvement in distributing devices for sowing fertilizing material, such as guano, bone-dust, plaster-of-paris, limestone, and other pulverized or powdered fertilizers. Great difficulty exists in distributing fertilizing material, from the fact that many of the fertilizers used are very sticky. The use of agitators as usually made to prevent the clogging of the devices is apt to make the fertilizer more sticky or mortar-like by reason of too much agitation or stirring of the material in the hopper-box.

The object of my invention is to overcome the difficulties hitherto existing in the fertilizer-distributers. It relates to that class of distributers which employ a series of smooth horizontal rotating disks arranged in the bottom of the hopper, on which the fertilizer rests and moves, which disks are provided with scrapers projecting through an opening in the seed-box and resting close to the top surface at one end of the horizontal rotating disk.

My invention consists, first, in arranging the horizontal disks with the vertical scraper projecting through an opening in the rear side of the hopper, in combination, with an agitator arranged to work directly in front of the discharge-orifice, to prevent the clogging of the orifice.

A second feature of my invention consists, in combination with horizontal moving disks provided with a series of scrapers projecting over the distributing-plate at one side, of a plain discharge-orifice on the rear side of the hopper, an agitator which occupies and works in the rear of the central vertical plane and directly in front or within the discharge-orifice, so as to agitate but a small portion of the fertilizing material resting on the revolving distributing-disk.

Another feature of my invention consists in combining with a series of plain discharging-orifices arranged in the rear of a fertilizer-box and severally above a series of plain horizontal disks, a sliding gate or cut-off provided with suitable means for adjusting this gate so as to regulate the quantity of material to be distributed.

Another feature of my invention consists in providing openings arranged around the circumferential bearing of the rotating disks, so as to allow the easy escape of dust and dirt which work into the bearing-surfaces of the rotating disks, and prevent the clogging or sticking of these disks. Unless escape-openings are provided the dust or dirt of fertilizing material works under the plate to such an extent as to cause them to bind or break some of the operating parts of the mechanism.

Other features of my invention will be fully set forth in the description of the accompanying drawings, forming a part of this specification.

In the accompanying drawings, Figure 1 represents a rear elevation of my improvement. Fig. 2 is a plan view of the same. Fig. 3 is a sectional elevation on line $x$ $x$, Fig. 1. Fig. 4 is a broken longitudinal section on line $y$ $y$, Fig. 2. Fig. 5 is a perspective view of the distributing device. Fig. 6 is a plan view of one of the bottom plates of the hopper with the disk removed, showing the inside construction of the same.

A represents the hopper. B represents the end frames upon which it rests.

C represents the horizontal driving-shaft.

C' represents the main driving-wheel, which is driven by a sprocket-chain or other suitable conveyers connecting with the main driving-shaft.

$c$ represents a gear at the opposite end of shaft C, meshing into gear-wheel $c'$, which drives the agitating shaft D.

E represents the driving-shaft for grain distributers D'.

$d$ represents a driving-gear receiving its motion from a pinion on the main driving-shaft.

The two shafts E and C are each driven independently by the main driving-wheel, so that either one can be thrown in and out of gear without affecting the operation of the other distributing mechanism.

F represents miter-gear wheels mounted on shaft C.

$f$ represents miter-gears mounted upon a stud or axle, $g$.

G represents a spider or bracket attached to and forming a part of the bottom of the hopper-plate H, and G' represents a hub formed in the center of spider G, which sustains and supports the disks I, which are provided with bosses journaling in the hubs G'. This bracket is provided with openings to allow the escape of dust, dirt, and other substances which work into the bearing $g'$ of the distributing seed-disks I.

I represents a horizontal distributing-disk, which is provided with bosses $g''$, which journal in the hubs G' and revolve therein.

$g$ represents a bolt, which is preferably made square, fitting in correspondingly-shaped holes pierced in disk I in a revolving washer, I'.

I'' represents a nut for holding the parts D I I' together.

J represents a ledge projecting up from the face of the hopper-plate H at the rear side of the hopper A.

J' represents a scraper attached to ledge J, and projecting tangentially over a portion of the revolving disk I.

K represents a shoulder or vertical wall lying outside of the distributing-wheel I. It corresponds in shape and vertical depth with the cut-off scraper J'. The parts J J' form the side walls of the discharge-orifices, under the plane of which the disk I revolves.

L represents a rising and falling gate, which is arranged vertically in front of and abutting the plates K J J'.

$j$ represents the discharging-orifice which is formed between the parts I K J. A distinguishing feature of this orifice is that it has no seed-box board which rests over its rear edge. It is essential to have the opening of this orifice as free as possible, so that the fertilizer will by gravity be readily carried by the plate I through the orifices without the liability of bridging, which occurs when a cap is used above the scraper J'. Another advantage in having no top or covering over the scraper J' is that it allows the pins or points of the agitator to be worked directly in the mouth of the opening, so as to crush, break, and clear away the lumps existing in the material to be distributed. Several different forms of agitators to prevent the bridging or clogging of the orifice in fertilizing-distributers are in common use—such as oscillating shafts carrying pins or floats, which move across the face of the orifice or revolving shafts, with stirrers made to revolve in the front of the discharge-orifice—any of which may be used in conjunction with my improved form of distributing-disks.

A feature of my invention consists in providing an agitating device which occupies only a portion of the horizontal plane of the box and works directly in front of the discharge-orifice and in rear of the plane of the stud $g$.

M represents a pivoted lever attached to the vertical wall A'.

N represents a link connecting the lever M with the gate L.

$l$ represents slotted lugs or ears attached to the gate L, through which slots pass bolts to sustain and hold the gate L in proper relation to the plane of the orifice $j$. By moving the lever M by handle M' the gate L can be raised or lowered to regulate the size of the discharge-orifice so as to control the quantity of material to be distributed.

O represents distributing-tubes, which are made of any desired material. One end of each tube is attached to the hopper vertically under the orifices $j$. The other ends of tubes O are attached to the grain-distributers D', so as to carry the fertilizer into the grain-tubes, which grain-tubes are attached to the grain-distributers D'.

P represents an annular recess in the bottom of the plate H, which corresponds in depth to the thickness of the disks I. $p$ represents slots or openings cut in the flange forming the bottom of this annular recess, so as to allow the ready escape of all material or substances which work into the bearings of the disks I.

A series of scraper or knife bearings for the horizontal disks to rest and revolve upon might be provided as an equivalent for the means here described; but the plan here shown I deem the best.

I am aware that Letters Patent No. 200,490 were granted H. P. Underhill, February 19, 1878, for a fertilizing device which contained a series of horizontal revolving-disks in combination with a series of stationary annular flanges surrounding the disks, and pivoted scrapers working in a spout-like orifice, and that the said device is also provided with an agitator which works above the orifice and pivoted scrapers.

My invention is an improvement upon the said Underhill patent in several respects—to wit, the rotating disk in my improvement projects outward to the extreme end of the orifice, and consequently carries the fertilizer to the extreme outer edge of the orifice, and thus makes a positive force-discharge and avoids clogging of the orifice in the mouth outside of the disks; second, my scrapers occupy any desired fixed plane across the face of the rotating disk, and I dispense with the use of the stationary flange outside of the rotating disk.

My invention also avoids a covering or top plate above the scraper, and covering the mouth of the orifice as in the Underhill patent.

In my invention the scrapers project inward but a small distance across the face of the disks, making a plain open discharge-orifice, through which the fertilizer is easily carried by the rotating disks.

My invention also contains another valuable improvement: the agitator is made to work directly in front of the mouth of the orifice and in the same horizontal plane. My agitator is also more effective because it works or stirs only a small portion of the material within the box, instead of moving over the entire plane of the rotating disks, as in said Underhill patent. These several advantages are very important and secure very beneficial results.

Instead of having gate L rise and fall, as shown, it may be made with slots corresponding in shape and size with the orifices $j$, and be made to slide back and forth laterally, and would be an equivalent to the form of gate here shown.

I claim—

1. A fertilizer-distributing device composed substantially of a plain rotating disk, I, upon the face of which is carried the fertilizer, in combination with an open discharge-chute formed on one side by the scraper J′ and the opposite side by the ledge J, the ends of which chute terminate vertically above the peripheral plane of the disk and forming the discharge-orifice, as set forth.

2. A fertilizer-distributing device composed substantially of a plain rotating disk, I, upon the face of which is carried the fertilizer, in combination with an open discharge-chute formed on one side by the scraper J′ and the opposite side by the ledge J, the ends of which project through the rear side of the hopper and form the discharge-orifice vertical above the peripheral plane of the disk, as and for the purpose specified.

3. A fertilizer-distributing device composed of the horizontal rotating disk I and a scraper, J′, and a ledge, J, forming a delivery-orifice arranged in the box A, in combination with the agitator B, working in front of and in the same horizontal plane as the discharge chute and orifice $j$, substantially as herein set forth.

4. A fertilizer-distributing device composed of the horizontal rotating disk I and scraper J′ and ledge J, forming a discharge-chute arranged in the seed-box A, in combination with the agitator B, working in the rear of the vertical axial plane of the disk I and in front of the discharge-orifice, substantially as herein set forth.

5. In combination with the fertilizer-distributer I J′ K, the adjustable cut-off and regulating-gate L, arranged to operate in front of the discharge chute and orifice $j$, substantially as herein set forth.

6. The hopper-bottom provided with a vertical ledge, J, a vertical wall, K, and a discharge-orifice, $j$, the said ledge having an attached immovable scraper, J′, which extends inwardly and occupies a fixed position at all times, in combination with a plane-faced disk, I, supported by the hopper-bottom directly beneath the scraper, said disk extending through an opening in the rear side of the hopper and rotating under the extreme outer edge of the discharge-orifice $j$, all substantially as described.

7. In a machine for distributing fertilizing material, the combination of the following characteristics, namely: a hopper-bottom having a lateral discharge-orifice, $j$, open at its top, a plane-faced rotary disk extending through an opening in the rear side of the hopper and rotating under the extreme outer edge of the discharge-orifice, an immovable scraper, J′, extending longitudinally across the rotating disk, and forming also one of the stationary boundaries of the discharge-orifice, an agitator arranged to rotate between the discharge-orifice and the axis of the rotating disk, and an adjustable gate arranged within the hopper and extending across the mouth of the discharge-orifice, all substantially as described.

8. In a machine for distributing fertilizing material, the skeleton-spider connected with the hopper-bottom, and having a central recessed hub, G′, in combination with the rotating plane-faced disk I, having a central boss, $g''$, resting in the hub, and the bolt $g$, passing through and connecting the parts, substantially as described.

9. In combination with the horizontally-rotating disk I, the spindle G, having hub G′, provided with annular bearings $g'$, and openings $f$, for the escape of dirt, substantially as herein set forth.

In testimony whereof I have hereunto set my hand in the presence of two subscribing witnesses.

JOHN M. WESTCOTT.

Witnesses:
J. H. CHARLES SMITH,
JNO. E. JONES.